United States Patent
Luth et al.

(10) Patent No.: US 11,842,361 B2
(45) Date of Patent: Dec. 12, 2023

(54) ONLINE BEHAVIOR, SURVEY, AND SOCIAL RESEARCH SYSTEM

(71) Applicant: LUTH RESEARCH, LLC, San Diego, CA (US)

(72) Inventors: Roseanne Luth, Rancho Santa Fe, CA (US); Sean Miller, San Diego, CA (US); Baixue Wu, San Diego, CA (US)

(73) Assignee: LUTH RESEARCH, LLC, San Diego, CA (US)

( * ) Notice: Subject to any disclaimer, the term of this patent is extended or adjusted under 35 U.S.C. 154(b) by 155 days.

(21) Appl. No.: 16/886,471

(22) Filed: May 28, 2020

(65) Prior Publication Data
US 2021/0295359 A1     Sep. 23, 2021

Related U.S. Application Data

(60) Provisional application No. 62/990,882, filed on Mar. 17, 2020.

(51) Int. Cl.
*G06Q 30/0203* (2023.01)
*G06N 5/04* (2023.01)
*G06N 20/00* (2019.01)

(52) U.S. Cl.
CPC ........... *G06Q 30/0203* (2013.01); *G06N 5/04* (2013.01); *G06N 20/00* (2019.01)

(58) Field of Classification Search
CPC ........... G06Q 30/0203; G06Q 30/0255; G06Q 30/02; G06Q 30/0222; G06Q 30/0201;
(Continued)

(56) References Cited

U.S. PATENT DOCUMENTS 10,885,576 B2 * 1/2021 Deo ................... H04L 67/535
2018/0316571 A1 * 11/2018 Andrade .......... G06Q 10/06398
(Continued)

FOREIGN PATENT DOCUMENTS

WO   WO-2009155375 A2 * 12/2009 ....... G06Q 10/06395

OTHER PUBLICATIONS

A. Chanakitkarnchok, et al. "Autonomous website categorization with pre-defined dictionary," 2016 13th Int'l Conference on Electrical Engineering/Electronics, Computer, Telecom and Info Technology (ECTI-CON), Chiang Mai, Thailand, 2016, pp. 1-6 ieeexplore.ieee.org/document/7561432?source=IQplus (Year: 2016).*

*Primary Examiner* — Jerry O'Connor
*Assistant Examiner* — Michael R Koester
(74) *Attorney, Agent, or Firm* — Sheppard, Mullin, Richter & Hampton LLP

(57) ABSTRACT

An online behavior, survey, and social research system is provided. In some embodiments, the system comprises a hardware processor; and a non-transitory machine-readable storage medium encoded with instructions executable by the hardware processor to perform a method comprising: collecting data from a user device of a user, the data representing actions performed by the user on one or more network sites; receiving an event match configuration specifying one or more patterns of interest; generating event matches based on the collected data and the event match configuration, wherein each of the event matches represents a portion of the collected data matching with one or more of the patterns of interest; receiving a project configuration specifying a time period of interest; generating a user journey report comprising the event matches occurring during the time period of interest; and providing the user journey report to a client device.

19 Claims, 14 Drawing Sheets

(58) Field of Classification Search
CPC ...... G06F 16/338; G06F 16/951; G06F 16/00; G06F 16/2228; G06N 20/20; G06N 20/00
See application file for complete search history.

(56) References Cited

U.S. PATENT DOCUMENTS

2019/0325062 A1* 10/2019 Rogulenko ......... G06F 16/2343
2020/0045519 A1* 2/2020 Raleigh ................ G06F 3/0482

* cited by examiner

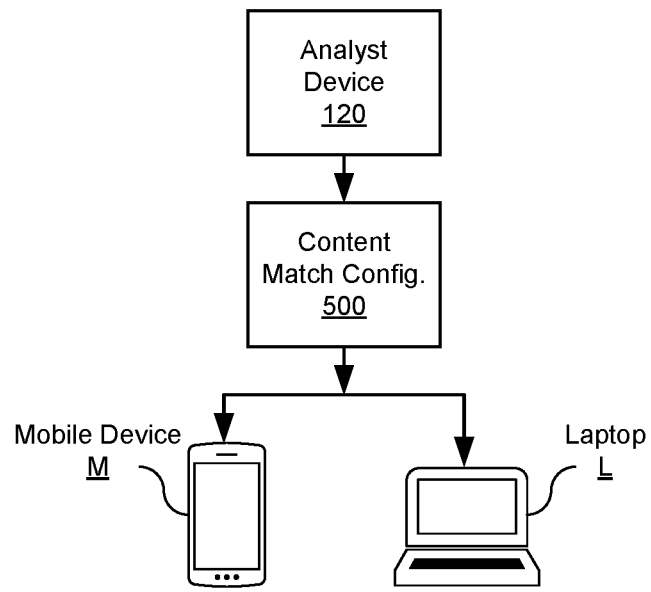
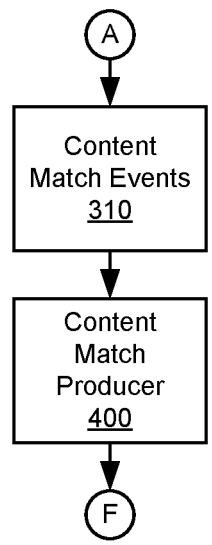
FIG. 6

ONLINE BEHAVIOR, SURVEY, AND SOCIAL RESEARCH SYSTEM

CROSS REFERENCE TO RELATED APPLICATIONS

The present application claims priority to U.S. Provisional Patent Application No. 62/990,882, filed Mar. 17, 2020, entitled "Research Database with Contributor Ownership," the disclosure thereof incorporated by reference herein in its entirety.

This application is related to U.S. application Ser. No. 13/726,947, filed Dec. 26, 2012, and U.S. Provisional Application No. 61/580,285, filed Dec. 26, 2011, the disclosures thereof incorporated by reference herein in their entirety.

DESCRIPTION OF RELATED ART

The disclosed technology relates generally to data communication networks, and more particularly some embodiments relate to managing network devices in such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 illustrates the content match system according to some embodiments of the disclosed technology.

Figure 1:
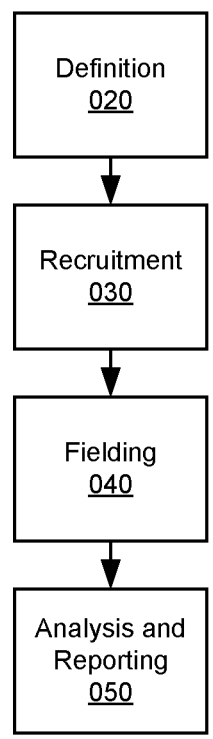
FIG. 1 shows an overview flow chart of an online behavior research process of the disclosed system, according to some embodiments of the disclosed technology.

The figures are not exhaustive and do not limit the present disclosure to the precise form disclosed.

DETAILED DESCRIPTION

Embodiments of the present disclosure are directed to a system and method for researching online behavior utilizing client, customer survey, and research respondent groups. Various embodiments provide a research methodology leveraged to help clients better understand consumer's online behavior. The research data collected via this methodology may be used to support clients with their advertising, marketing and branding strategies and campaigns, as well as other business operations. Some embodiments create an opt-in digital community comprised of members who allow their online activity to be tracked and also participate in online research surveys. The digital community consists of a group of users that have downloaded and installed the SavvyConnect software, which may be implemented as an application or app, and any additional media usage tracking technologies.

All data collected by the SavvyConnect software and other systems and processes may be integrated together for analysis. Members may differ for each community, which may be customized based on the respondent criteria identified by the client. The communities may be active for a designated period of time. The respondent criteria and the timeframe of the community may be determined based on the overall business objectives and research needs identified by the client.

The digital data may be analyzed to answer questions about what individuals are actually doing online. Additional data may be integrated to answer questions about why consumers participate in the online activity. The additional data integrations may include research surveys, focus groups, demographic data, profiling data, other forms of behavioral tracking data (such as mobile device tracking, gaming device tracking, and TV streaming device tracking), and third party data.

The SavvyConnect software is available from the Applicant Luth Research, LLC and is the subject of a previously filed US Utility patent application U.S. Ser. No. 12/818,603, titled SYSTEM AND METHOD FOR COLLECTING CONSUMER DATA, filed on Jun. 18, 2010, based upon the previously filed U.S. Provisional Patent Application Ser. No. 61/269,218, filed on Jun. 22, 2009. The disclosures of these US patent applications are incorporated by reference herein in their entirety.

The SavvyConnect software may comprise a system having a plurality of client devices connected to the Internet. The client devices may detect and collect information regarding a user's browsing activity, and may transmit this information to a server via the Internet. The client device may be any device capable of communication over the Internet via a browser or app, including, but not limited to, general purpose computers, smartphones and other wireless communication devices, internet enabled TVs and auxiliary devices, and the like. The server may be a computer located at a central site for receiving and processing the information gathered by client devices. The client device may include data input elements such as a keyboard or pointing device. The client may further include appropriate communications hardware and volatile and non-volatile memory elements in or on which are stored an operating system and application software which allow a user to send and receive data.

FIG. 1 shows an overview flow chart of an online behavior research process 10 of the disclosed system, according to some embodiments of the disclosed technology. Referring to FIG. 1, the process 10 includes a definition process 20. The definition process 20 may include establishing objectives, selecting community types and defining community parameters. The types of Tribe include but are not limited to Impact Monitoring, Digital Life, Cross Media, Multi-Sense and Behavioral Pattern. Each type of community may have its own methodology and implementation. After establishing objectives, a target audience may be defined using predetermined qualification criteria and participation quotas. Finally, community details may be defined, for example by employing total community population data, determining the length of engagement, defining additional data sources and defining deliverables. The result is that a community is defined through this detailed calculation process.

The recruitment process 30 may include sampling sources, screening and qualification, downloading the SavvyConnect app and/or application, agreement and installation, and community activation, all leading up to qualified quota groups and a Research Panel or a community.

The fielding process 40 may allow for a screening questionnaire leading to a community, and may include performing surveys and stimuli, monitoring, and data integration. Following the completion of recruitment, data collection may occur, for example according to one or more of five example pathways. Pathway (1) may include monitoring involving a pre-monitoring survey, an observation cycle, stimuli, another observation cycle, a post-monitoring survey, optional qualitative in-depth interviews, monitoring community data integration, and the like. Pathway (2) may include digital life analysis, an observation cycle, possible qualitative in-depth interviews, digital life community data integration, and the like. Pathway (3) may include cross-media analysis, an observation cycle, one or more follow-up research surveys, possible qualitative in-depth interviews, cross-media community data integration, and the like. Pathway (4) may include multi-sense analysis, an observation cycle, one or more follow-up research surveys, possible qualitative in-depth interviews, multi-sense community data integration, and the like. Pathway (5) may include uses behavior pattern analysis, followed by task assignment, an observation cycle, one or more follow-up research surveys, possible qualitative in-depth interviews, behavioral pattern community data integration, and the like.

In the analysis and reporting process 50, community data sets may be run through one or more analytical procedures including weekly pattern or day part pattern analysis, search term analysis, site correlation analysis, best path analysis, domains of influence analysis, and the like. These analysis procedures may be selected by the client to be implemented individually, or as a group to best address research objectives outlined at the onset of the community. Performance of these analyses may result in the generation of one or more reports, including weekly pattern analysis reports, search term analysis reports, site correlation analysis reports, best path analysis reports, domains of influence analysis reports, and the like, all of which may lead to recommendations, which may be generated to guide the client's decisions and actions to achieve more effective marketing practices and enhance business outcomes.

In some embodiments, the online behavior research process 10 may include elements that produce a research database with contributor ownership. In such embodiments, each contributor has a financial interest in the database(s) to which they have provided research data. For example, each person who has allowed their behavioral data to be collected in a research database may own stock in a company that owns the research database. In this disclosure, such a person is referred to as a "member."

The Database may include various types of data captured and/or delivered and submitted into the Database. This data may include behavior data tracked through our the SavvyConnect software, data obtained from self-reported surveys and interviews, behavior data obtained from third parties with a member's consent, and any social or related data satisfying our requirements. Through community participation, the system may create a dynamic, secure, and longitudinal database along with a supporting ecosystem geared towards the compilation of survey and behavioral insights. Making the Database available to third parties, with the members' consent, may facilitate insights which lead to greater predictive power of behavioral information for client applications.

Such research databases have significant value. In various embodiments, organizational knowledge of market conditions and competition is gained by researching relevant sectors, which provide advantages for entry into new and established industries including, but not limited to, automotive, travel, financial services, and healthcare. Embodiments enable effective strategies to be implemented, and enable the assessment of global environments in the service sectors, as well as foreign market trade and investment barriers. Research is utilized for promoting export opportunities and inward investment, helping determine how to execute competitive strategies, focusing on objective policies and strengthening global opportunities. Research is a medium that influences, administrates and enforces agreements, preferences, leveling trading environments and competitiveness in the international marketplace.

The retail industry aspect of online market research is being transformed worldwide by Mobile Commerce ("M-Commerce") with its mobile audience, which is rapidly increasing as the volume and varieties of products purchased on the mobile medium increases. Research conducted in the markets of North America and Europe has revealed that the M-Commerce penetration on the total online retail trade had attained 10% or more as of 2019. In emerging markets, smart-phone and tablet penetration is fast increasing and contributing significantly to online shopping growth.

Big data is abundant. Data is captured and stored on almost every platform consumers use. The potential to unlock the various paths that individuals take in making a decision involves the ability to identify, capture, and organize the data.

The Database addresses four primary issues that have hindered research. First, the scale and scope of datasets have been inadequate for broad applicability for the widest population. Researchers require larger sample sizes, more in depth data, and greater subject diversity (e.g., gender, ethnicity, age, socioeconomic status). Second, the data in conventional databases have lacked any structure, and so cannot be aggregated or reduced to satisfy smaller segments. Third, data is siloed at a high level in many instances, and consent is not granted from the individual to release data for research. Finally, people have been treated as inconsequential and not holders of tremendous value for research. But because people hold valuable behavior information, they should be treated as research partners and recognized and rewarded for their contributions to the research.

When enabled, individuals will seek involvement as research partners with the opportunity to participate in providing data they own, especially if they are managing their own privacy. Embodiments unlock the potential for discovery with the largest aggregation of behavioral, survey and social data ever assembled. By engaging individuals proactively and responsibly, embodiments facilitate purpose-driven deep engagement that will lead to an information-rich, active, and longitudinal data community. Through a people-centered effort, embodiments achieve the scale and scope to enable research for a wide range of products and services, as well as increase understanding of changing trends and habits. A flexible platform of magnitude architected with smart contract capability and technical extensibility to ingest data associated with a wide variety of sources (e.g., web tracking, social, surveys, etc.) has the statistical power to reveal the underpinnings of many social and environmental developments.

Arguably, no data is as personal as an individual's own web data, which constitutes a blueprint of each individual's life and interests. In current marketing research and marketing practice, privacy is typically protected by concealing the identities of study participants, while certain types of data are shared freely. Standard data security controls are often sufficient for protecting identity data itself, but in many cases the freely-shared data from various technology advancements and items remains vulnerable to misuse.

There are a variety of reasons people participate in market research studies. Some reasons may be personal, such as the desire to receive an incentive or simply to provide their unbiased opinion. Other motivations may be broader or more altruistic, such as the desire to improve products and services for themselves and society. In all cases, there must exist a level of trust between the research participant and the investigators that they are pursuing a shared goal. Unfortunately, what is perceived to be the failure of some market leaders to maintain the trust of study participants can have lasting negative effects on the science as a whole.

Privacy, security, and trust are core pillars of the Database and are reflected in the technology used to ensure the best possible management and maintenance of information. It is important to note that, unlike conventional solutions that broker sale of individuals' data, the disclosed embodiments allow marketing discovery based on de-identified metadata.

Market research industry associations adhere to strict requirements for gaining permission of respondents for their opinions and behavioral data. Asking for permission entails a double opt-in process. In this process, when the individual is sent a request or goes online to enroll, there is an additional step of requesting their agreement to participate in the research. The details of the participation are apparent, so the individuals understand the requirements associated with their participation. Sometimes the field of the informed consent is very narrow, such as in studies involving actions needed for each step of the project to determine longitudinal studies of a particular use or habit. In other cases, the consent can be broad, enabling current and future tracking for research information on a broad scale where the projects or information measures trends and are yet to be defined. Occasionally, data collected as part of a research study can be shared and/or re-examined by other investigators for a secondary study. In practical terms, this variability means the usefulness of a collection of data sets is circumscribed by the subset with the narrowest terms of consent. This presents a clear scalability problem and limits the utility of historical datasets, if the individuals represented in the data are unavailable to provide a more broadly informed consent. Embodiments of the disclosure ensure an informed consent process that is according to standards that are clear and effective.

Unfortunately, much of the web data collected by others remains limited and dependent on algorithms to extract small samples for research or marketing to apply and then project to the masses. The reason for this is that incoherent and inconsistent codes hampers organized database and data management practices. Websites and web behavior is profuse and categorizing even the most visited sites is daunting for most companies.

With the options for putting apps and other social sites on devices, clients are requesting to track data from apps and social sites which are outside of a website. Even if technology can keep up, there are barriers to obtaining data when hindered by corporate self-interest to keep the data private. By aligning with a broad base of members who individually have access to their data generated from these sources, embodiments collect, aggregate, and make available to researchers a much broader range of data than available currently. The two intersecting trends of traditional self-reported data from market research and the capability to combine behavior data creates a unique opportunity. Now researchers can collect the "what" and also provide the "why."

The disclosed embodiments provide the opportunity for individuals to receive compensation for contributing their social and/or behavior information. Consumer-driven privacy rules and laws are accelerating individual's access to their information. Embodiments engage with other partners who have shopping, credit card, health data, and the like with full transparency of what we collect and why. Together, these forces create the ideal time and place to develop a shared, secure, and member-controlled market research data platform.

To date, obtaining large volumes of high-quality research and behavior lifestyle data has been a major challenge in the research field. But by being independent and agnostic to any analysis technology platform and brand, the disclosed embodiments may gather data from multiple sources without conflict of interest. A member's information can be acquired by companies that help society in the marketplace, while also being shared in the Database in support of discovery. There is no need to choose between these two options.

In the disclosed embodiments, new members can join a community and receive shares by contributing validated information and providing consent for such data to be used anonymously in population-wide research. A wide range of data may be accepted, including surveys, personal interviews, and tracking behavior on devices. In addition, the disclosed embodiments may collect social and environmental data from new and existing members.

Given the high variation in data quality throughout the industry, the disclosed embodiments may take certain measures to validate the data submitted by members and potential members to assure a high quality of data in the Database. Such measures may include requiring members to provide supporting information along with submissions, employing spam-blocking techniques, cross-checking data using validation tools, assessing data overlap, and generally confirming that data is submitted in accordance with terms for such data type.

The disclosed embodiments build a "community-owned" Database by providing members with ownership in the Database as consideration for contributing personal and social data, including behavior and survey data for research, as described herein. The Database can earn income through the sale of access to its de-identified metadata and research findings to customers in the research industry and other industries. Information inputs into the Database may include self-contributed information, other social data, and behavior data, which may be collected through the SavvyConnect software. The Database may be extensible such that future data inputs can be added.

The disclosed embodiments may make de-identified member data in an aggregated, indexed, or otherwise analyzed fashion available to third-parties for their research use in ways that are designed to avoid the potential for learning the identity of the person or persons who contributed a particular item or set of the data. This population-level or representative sampling may have various purposes, including the advancement of products and services, identifying links between human behavior and purchase intent, and other commercial applications, such as determining opportunities for targeted marketing that would seek voluntary participation (e.g. how many members purchase a particular product or service).

By making the Database community-owned, embodiments allow members to become participants and beneficiaries, encouraging new members to join and members to actively participate and continue contributing their data for additional compensation in the form of ownership of the data. For example, as a member participates in more surveys, supports downloading the SavvyConnect software to gather behavior data, and supplies other valuable member data in the Database, that member's ownership stake in the Database increases. When brands or research organizations pay to run queries against the Database, profits from these transactions enable dividends to the Database members, proportionately to their ownership, and therefore to the value of data each member contributed.

As the Database grows, it will become increasingly valuable to organizations and research industries. Unlike conventional approaches, proceeds generated by selling access to the data inure in part to the benefit of the member community. Members may always retain the ability to withdraw their member data from the database, for example by terminating their consent, purging selected member data, and the like.

As discussed above, community ownership addresses many of the challenges that exist due to the prevalence of data silos, lack of trust in commercial entities monetizing an individual's data, lack of trust in research activities that go dark once information is provided, and lack of single data standards hindering large-scale research studies. The disclosed embodiments update members on studies being performed and results that accrue. A primary motivation for many members may be to support the greater good through discovery. The disclosed embodiments encourage this type of participation through regular communications in order to build trust in the management of the Database and its contributions to the community.

Now a Journey Analysis system and process is described with reference to FIGS. 2-9. The journey analysis process may be implemented as part of the online behavior research process 10 of FIG. 1. According to some embodiments, the Journey Analysis system and process enables an analyst to mine insights for clients about how users interact with websites and apps. The analyst may interact with a series of configuration tables, where the analyst may specify pattern recognition techniques for the system to use when producing data related to specific research needs. Data may be collected and stored in a distributed file system and processed using various technologies used for processing large amounts of data at once in a scalable manner and storing that data in relational databases and a primary data warehouse accessible by analysts for the production of various client dashboards and reports.

Figure 2:
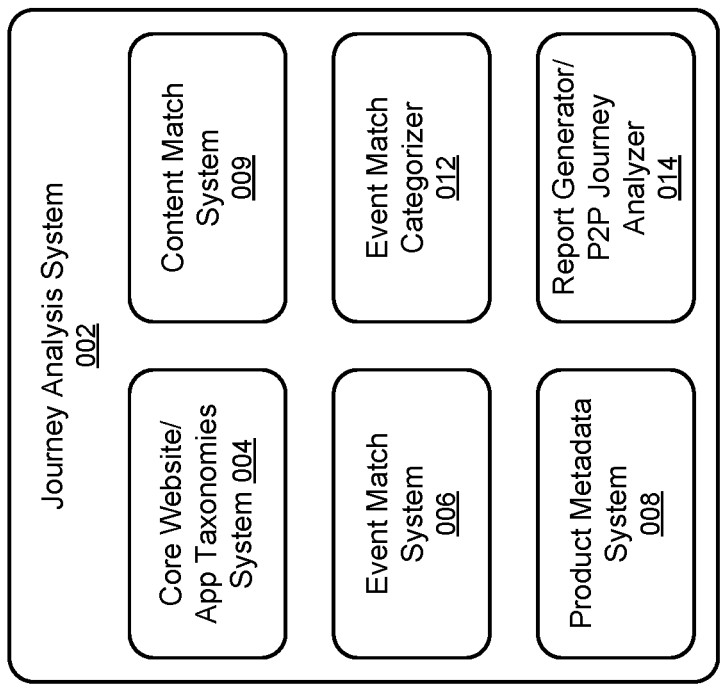
FIG. 2 illustrates a Journey Analysis system according to some embodiments of the disclosed technology.

FIG. 2 illustrates a Journey Analysis system 002 according to some embodiments of the disclosed technology. Referring to FIG. 2, the system 002 may include a core system 004. The core system 004 may collect core data meaningful to clients and analysts, and may create taxonomies to categorize the types of websites and apps users interact with. These taxonomies allow the system to categorize visits to webpages and usage of apps to standardized categories of interest to clients. Embodiments of the core system 004 are described in detail below with reference to FIG. 3.

The system 002 may include an event match system 006. The event match system 006 may provide a supplemental data processing mechanism to process data for the presence of specific indicators that indicate a user has performed a specific action on a certain site. Embodiments of the event match system 006 are described in detail below with reference to FIG. 4.

The system 002 may include a product metadata system 008. The product metadata system 008 may obtain additional details (metadata) concerning products identified by the event match system 006, and may store these metadata in a product metadata library (PML). Embodiments of the product metadata system 008 are described in detail below with reference to FIG. 5.

The system 002 may include a content match system 009. The content match system 009 may collect raw Page Content for specific pages of interest, which may be parsed in order to provide further metadata to the PML. Embodiments of the content match system 009 are described in detail below with reference to FIG. 6.

The system 002 may include an event match categorizer 012. The event match categorizer 012 categorizes events according to the taxonomies in order to make the events more meaningful to clients. For example, the categories may include industry, vertical, and the like. Embodiments of the event match categorizer 012 are described in detail below with reference to FIG. 7.

The system 002 may include a report generator/Path to Purchase (P2P) journey analyzer 014. The report generator/P2P journey analyzer 014 analyzes the data collected and processed by the other components to generate Journey Analysis reports that are customized for particular clients according to project configurations provided by an analyst. Embodiments of the report generator/P2P journey analyzer 014 are described in detail below with reference to FIG. 8.

Figure 3:
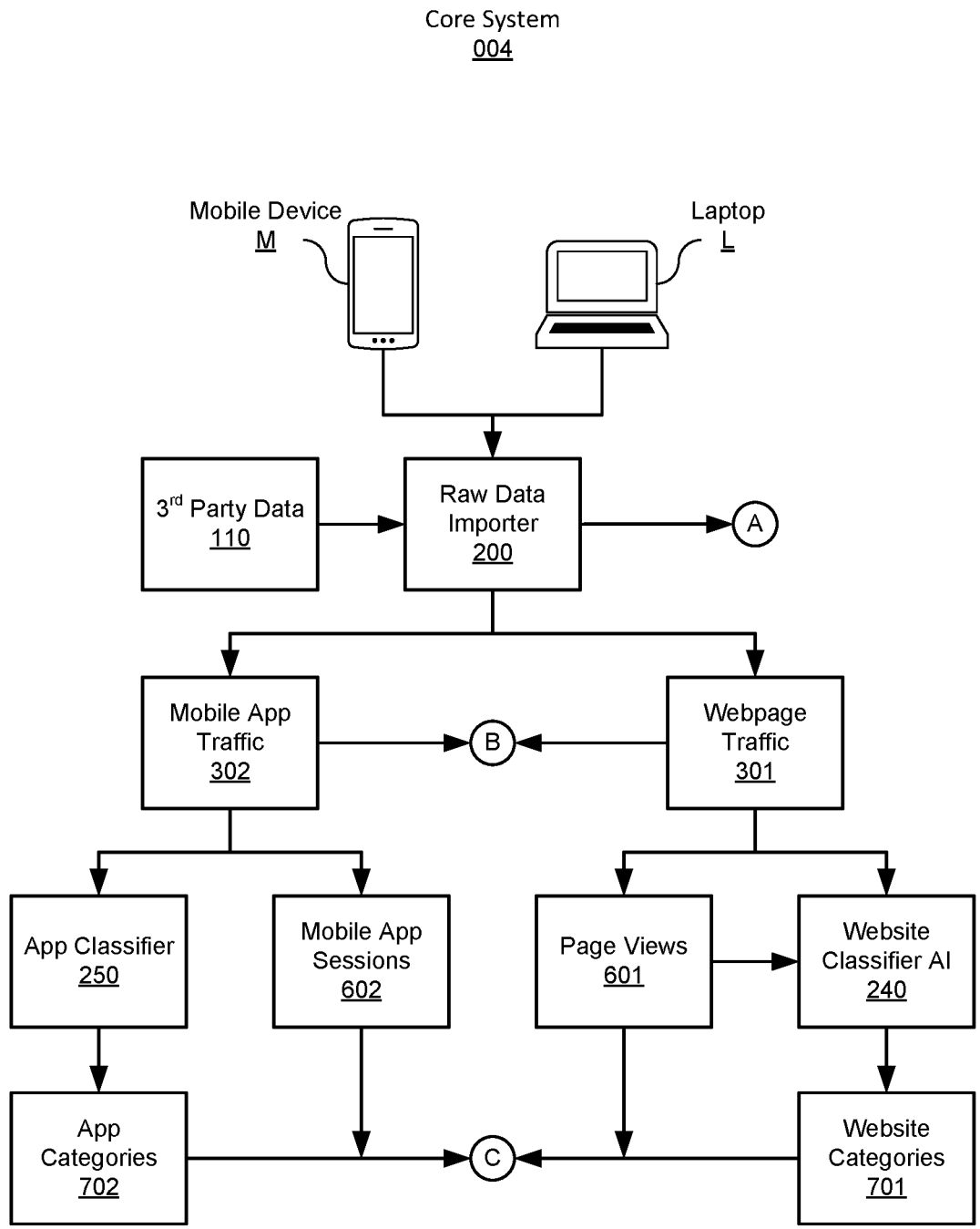
FIG. 3 illustrates the core system according to some embodiments of the disclosed technology.

FIG. 3 illustrates the core system 004 according to some embodiments of the disclosed technology. The core system 004 may collect and process raw data, from user devices and other sources. Referring to FIG. 3, example user devices may include a mobile device M and a laptop computer L. But while embodiments of the disclosed technology are described with reference to mobile devices and laptop computers, the user devices may include any device capable of performing the functions described herein for the mobile devices or laptop computers. Each user device may have a software component installed to facilitate collection of the raw data from the user device. For example, a user of the mobile device M may download and install the SavvyConnect app, and a user of the laptop may download and install the SavvyConnect application, which may take the form of a browser extension. The SavvyConnect software by collect certain data from the user device. For example, the data may include data related to webpages visited, apps used, and the like. The core system 004 may also receive $3^{rd}$ party data 110 from other third parties The core system 004 may include a raw data importer 200. The raw data importer 200 may import the data collected by the software executing on the user devices, as well as $3^{rd}$ party data 110. The raw data importer 200 may also perform initial processing on the raw data. For example, the raw data importer 200 may process the raw data to generate events. Each event may represent an action performed by a user with a user device.

The raw data importer 200 may also separate data collected from mobile devices apps from data collected regarding webpage visits. In particular, the raw data importer 200 may generate mobile app traffic 302. The mobile app traffic 302 may be implemented as a collection of raw events tables representing the web traffic collected from one or more apps executing on the user devices. The webpage traffic 301 may be implemented as a collection of raw event tables representing webpages visited, and the web traffic seen while on those sites.

The core system 004 may also generate mobile app sessions 602 based on the data collected from user devices apps. The mobile app sessions 602 may take the form of a distilled analyst-friendly data set that details the usage of apps on mobile devices.

The core system 004 may include an app classifier 250. The app classifier 250 may be implemented as a process for analyzing the mobile app traffic 302 to categorize that traffic into app categories 702. The app categories 702 may be implemented as an analyst-friendly data set that allows analysts and clients to understand to which app and app category particular mobile app traffic 302 belongs. For example, mobile app traffic 302 associated with shopping behavior may be assigned to a "Shopping" app category.

The core system 004 may process the webpage traffic 301 generate page views 601. The page views 601 may be implemented as a distilled analyst-friendly data set the details user visits to websites derived from the webpage traffic 301. The core system may include a website classifier artificial intelligence (AI) 240. The website classifier AI 240 may categorize the page traffic 301 and the page views 601 into website categories 701. The website classifier AI 240 may be implemented as an AI-driven machine learning algorithm. The algorithm may tokenize specific content of the webpage, and apply machine learning to categorize against known training set to create the website categories 701. For example, the website classifier AI 240 may apply the page views 601 and the webpage traffic 301 as inputs to a trained machine learning model, which may output classified webpages in response. The website categories 701 may be implemented as an analyst-friendly data set allowing analysts and clients to understand to which website categories 701 each page view 601 corresponds. For example, the particular shopping websites may be categorized in a "Shopping→Shopping Portals & Search Engines" website category.

Figure 4:
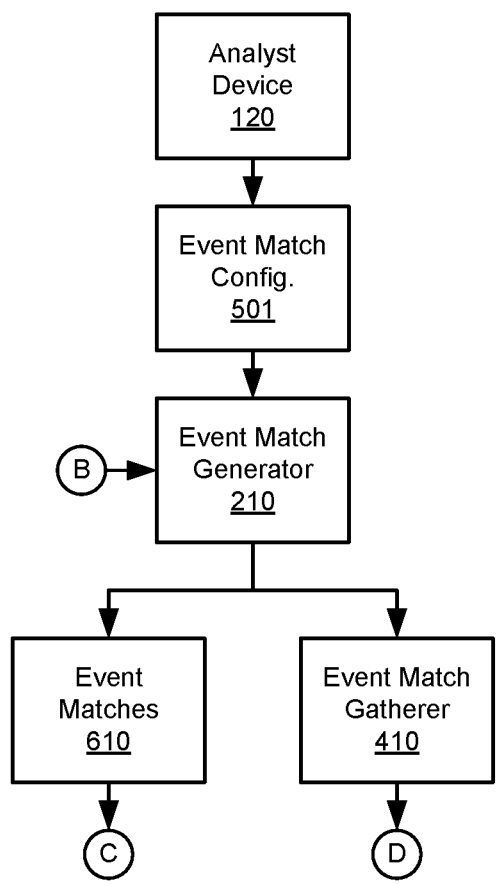
FIG. 4 illustrates the event match system according to some embodiments of the disclosed technology.

FIG. 4 illustrates the event match system 006 according to some embodiments of the disclosed technology. The event match system 006 may match particular events generated by the raw data importer 200 of the core system 004 with particular patterns of interest, which may be provided by an analyst operating an analyst device 120. The analyst device 120 may be implemented as any device capable of performing the functions described herein. For example, the analyst device 120 may be implemented as a general-purpose computer, or the like. The analyst may use the analyst device 120 to generate an event match configuration 501. The event match configuration may be implemented as a series of configurable parameters control by the analyst to identify the specific patterns of interest for matching events.

The event match system 006 may include an event match generator 210. The event match generator 210 may receive the event match configuration 501. The event match generator 210 may also receive the mobile app traffic 302 and the webpage traffic 301 from the core system 004, at tag B. The event match system 006 may be implemented as a series of automated data processes which extract specific events occurring within the mobile app traffic 302 and the webpage traffic 301 according to the event match configuration 501 to produce event matches 610. The event matches 610 may be implemented as a distilled analyst-friendly data set detailing what actions were performed on what websites and apps. The event matches 610 may also associate the actions with products. For example, a particular event match 610 may indicate that a particular user visited a particular shopping site and added a particular item to the user's shopping cart.

The event match system 006 may also include an event match gatherer 410. The event match gatherer 410 may synchronize the event matches with the product metadata library and event match categories. In some embodiments, the event match configuration 501 may be configured to capture an associated product codes with the specific event match action. In such embodiments, a corresponding record may be created in the product metadata library, and queued for later collection of additional details concerning the product. The event match gatherer 410 may be implemented as a script, or the like.

Figure 5:
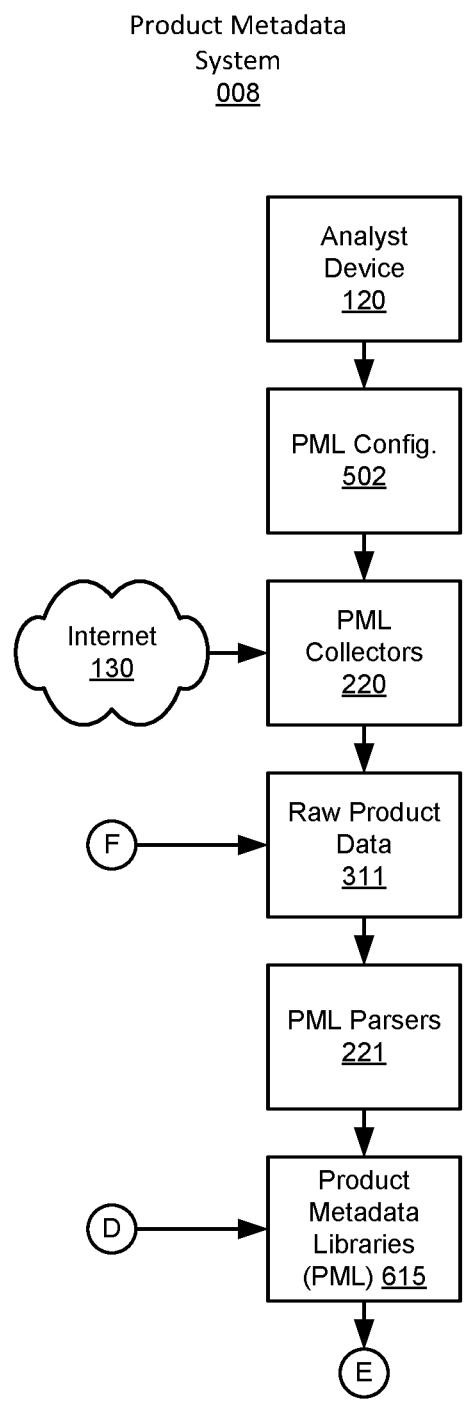
FIG. 5 illustrates the product metadata system according to some embodiments of the disclosed technology.

FIG. 5 illustrates the product metadata system 008 according to some embodiments of the disclosed technology. The product metadata system 008 may be implemented as a series of processes for creating and maintaining a product metadata library (PML) 615. The PML 615 houses metadata concerning products with which users interact. Example metadata may include product titles, prices, brands, categories, and the like.

An analyst may employ the analyst device 120 to generate a PML configuration 502. The PML configuration 502 may specify the mechanisms used to collect the metadata. The PML configuration 502 may also specify the order in which the metadata is collected. The PML configuration 502 serves to insulate the complex engineering processes of the online behavior analysis system 10 from the business-driven needs of the analyst.

The product metadata system 008 may include one or more PML collectors 220. The PML collectors 220 collected raw product data 311 directly from the Internet 130 according to the PML configuration 502. For example, the PML collectors 220 may obtain the raw product data via application programming interfaces (API), other web-based end points, and the like. The PML collectors may also collect data in concert with a content match configuration, at tag F, which is described in detail below. For example, an analyst may configure the PML collectors to collects specific page contents data whenever a user interacts with a specific page of interest. The raw product data 311 may be placed in a real-time processing queue for parsing. The raw product data 311 may also be saved in a relational data store after processing to allow future reprocessing in the event it is desired to extract additional details.

The product metadata system 008 may include one or more PML parsers 221. The PML parsers 221 transform the raw product data 311 into product metadata in accordance with the PML configuration 502. An analyst may configure the PML configuration 502 to chain multiple PML collectors 220 and multiple PML parsers 221 together in specific configurations to address site-specific needs on a case-by-case basis. The metadata generated by the PML parsers may be stored in the PML 615. The PML 615 may be implemented as a repository of distinct product codes seen in the event match data set 610, and provided by the event match gatherer 410, along with the associated metadata.

FIG. 6 illustrates the content match system 009 according to some embodiments of the disclosed technology. An analyst may employ an analyst device 120 to generate a content match configuration 500. The content match configuration 500 may be uploaded to the SavvyConnect software executing on the user devices, for example such as the mobile device M and the laptop L. The content match configuration 500 may cause the user devices to collect certain page contents of interest. For example, the contents of interest may include a product detail page on a shopping website. The data is downloaded to the Journey Analysis system 002 as content match events 310.

The content match system 009 may include a content match producer 400. The content match producer 400 may add the content match events 310 to the raw product data 311, at tag F, in a manner similar to that of the PML collector 220, and without the added overhead of needing to reach back out to the Internet 130 to pull the required data. The content match producer 400 may be implemented as a script or the like.

Figure 7:
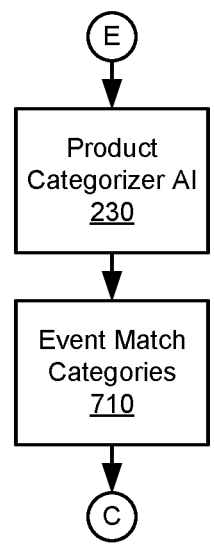
FIG. 7 illustrates the event match categorizer according to some embodiments of the disclosed technology.

FIG. 7 illustrates the event match categorizer 012 according to some embodiments of the disclosed technology. The event match categorizer 012 may include a product categorizer AI 230. The product categorizer AI 230 may categorize contents of the PML into event match categories 710 for the inclusion of specific events, page views, and app sessions into the report creation process and P2P Journey Analysis described below. The event match categorizer 012 may be implemented as an AI-driven machine learning algorithm. The algorithm may tokenize certain attributes from the PML, and apply machine learning compare against a training set of known data matching a common taxonomy.

The event match categories 710 may be implemented as an analyst-friendly dataset allowing analysts and clients to understand to which vertical, industry and/or category each event match 610 corresponds, in order to support inclusion of specific events, page views, and app sessions into the report creation process and P2P Journey Analysis.

Figure 8:
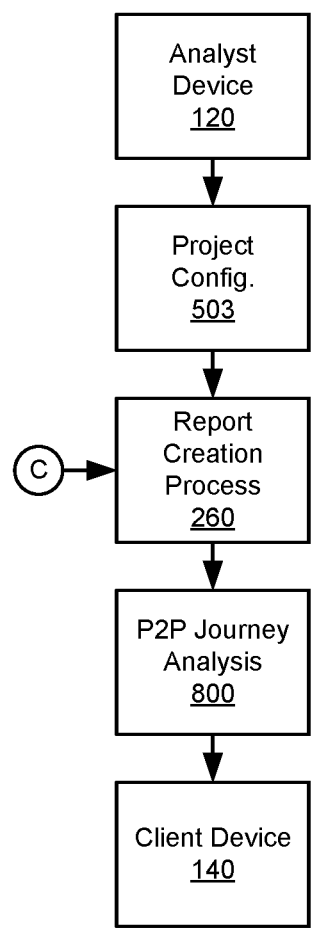
FIG. 8 illustrates the report generator/P2P journey analyzer according to some embodiments of the disclosed technology.

FIG. 8 illustrates the report generator/P2P journey analyzer 014 according to some embodiments of the disclosed technology. An analyst may employ the analyst device 120 to generate a project configuration 503. The project configuration 503 specifies parameters of a P2P Journey Analysis 800 to be created. Example parameters may include a time period of interest, types of users of interest, particular sites, particular apps, particular events, and the like. Like the other configurations, this configuration insulates the complex engineering processes needed to produce the analysis 800 from the business-driven needs of the analyst.

The report generator/P2P journey analyzer 014 may include a report creation process 260. The report creation process 260 may generate the P2P Journey Analysis 800 according to the project configuration 503 using the event matches 610 generated by the event match system 006, at tag C. The P2P Journey Analysis 800 may include one or more reports generated according to the project configuration 503. For example, the reports may detail a path to purchase journey of the user's shopping or interacting with a variety of verticals, industries, categories and the like.

Figure 9:
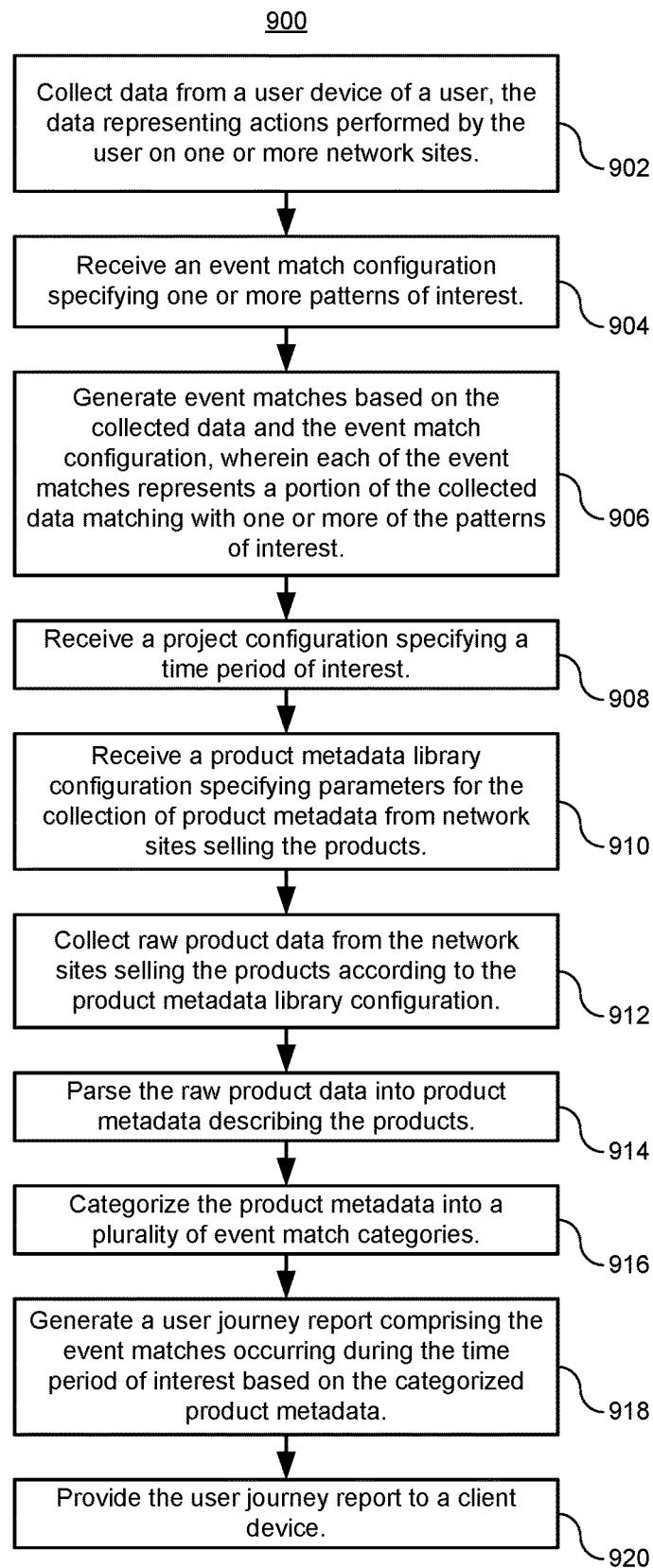
FIG. 9 illustrates an online behavior research process according to embodiments of the disclosed technology.

FIG. 9 illustrates an online behavior research process 900 according to embodiments of the disclosed technology. While the elements of process 900 are presented in a particular order, in some embodiments elements may be performed in other orders, in parallel, or omitted. Referring to FIG. 9, the process may include collecting data from a user device of a user, at 902. The data may represent actions performed by the user on one or more network sites. The data may be collected by the raw data importer 200 of the core system 004, for example as described above.

The process 900 may include receiving an event match configuration, at 904. The event match configuration may specify one or more patterns of interest. The event match configuration may be received by the event match system 006, for example as described above.

The process 900 may include generating event matches based on the collected data in the event match configuration, at 906. Each of the event matches may represent a portion of the collected data matching with one or more of the patterns of interest. The event matches may be generated by the event match system 006, for example as described above.

The process 900 may include receiving a project configuration, at 908. The project configuration may specify a time period of interest. The product metadata library configuration may be provided by an analyst using an analyst device 120, for example as described above.

The process 900 may include receiving a product metadata library configuration, at 910. The product metadata library configuration may specify parameters for the collection of product metadata from network sites selling the products. The product metadata library configuration may be received by one or more of the PML collectors 220 of the product metadata system 008, for example as described above The process 900 may include collecting raw product data, at 912. The raw product data may be collected from the network sites selling the products according to the product metadata library configuration. The collection of the raw product data may be performed by one or more of the PML collectors 220 of the product metadata system 008, for example as described above.

The process 900 may include parsing the raw product data into product metadata describing the products, at 914. The parsing of the raw product data may be performed by one or more of the PML parsers 221 of the product metadata system 008, for example as described above.

The process 900 may include categorizing the product management data into a plurality of event match categories, at 916. The categorizing may be performed by the product categorizer AI 230 of the event match categorizer 012, for example as described above.

The process 900 may include generating user journey report based on the categorized product metadata, at 918. The user journey reports may comprise the event matches occurring during the time period of interest.

The process 900 may include providing the user journey report to a client device, at 920. The user journey report may be part of the P2P Journey Analysis 800, and may be created by the report creation process 260 of the report generator/P2P journey analyzer 014, for example as described above.

Figure 10:
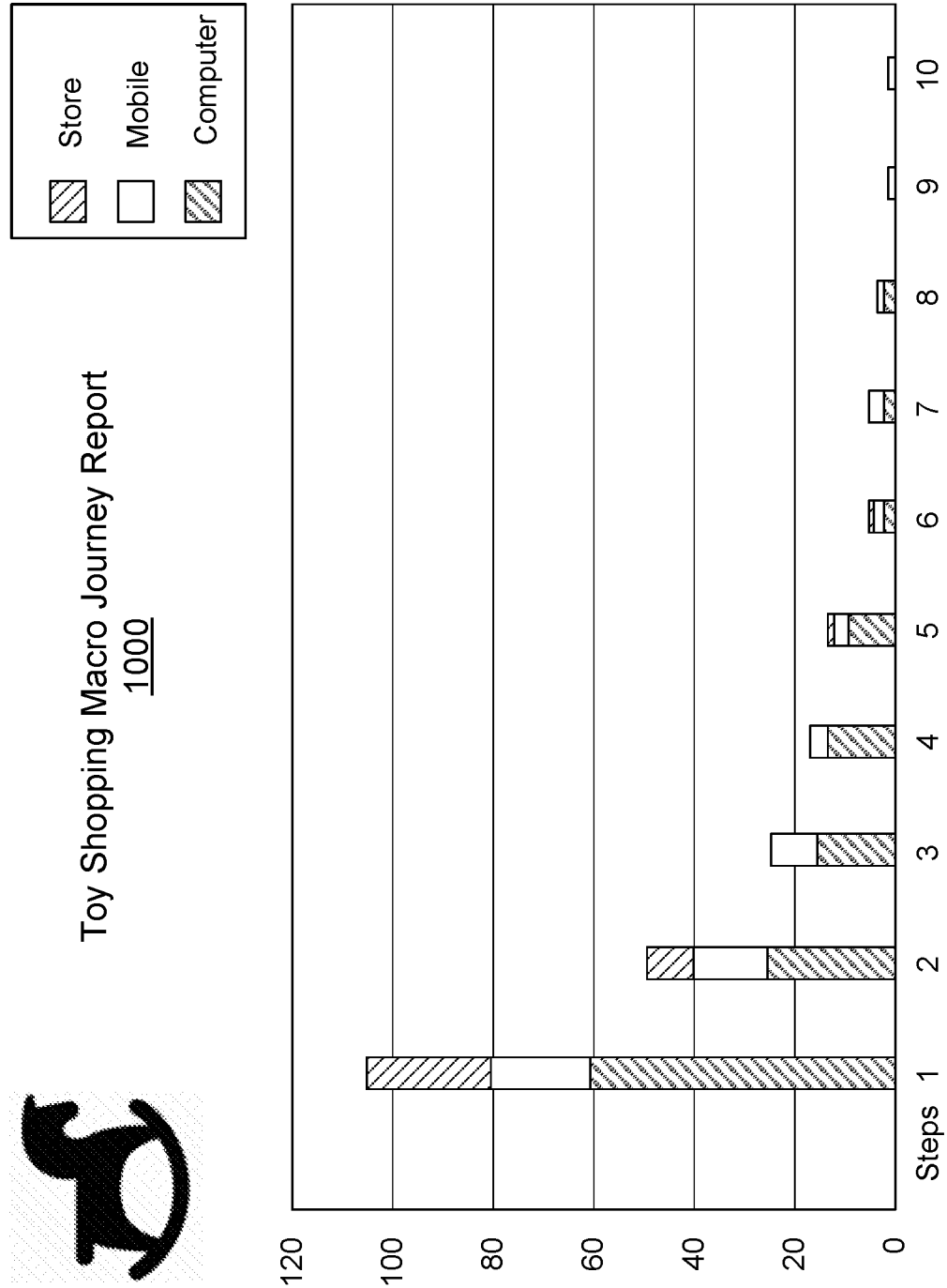
FIG. 10 illustrates an example macro journey report for toy shopping across multiple retailers according to some embodiments of the disclosed technology.
Figure 11:
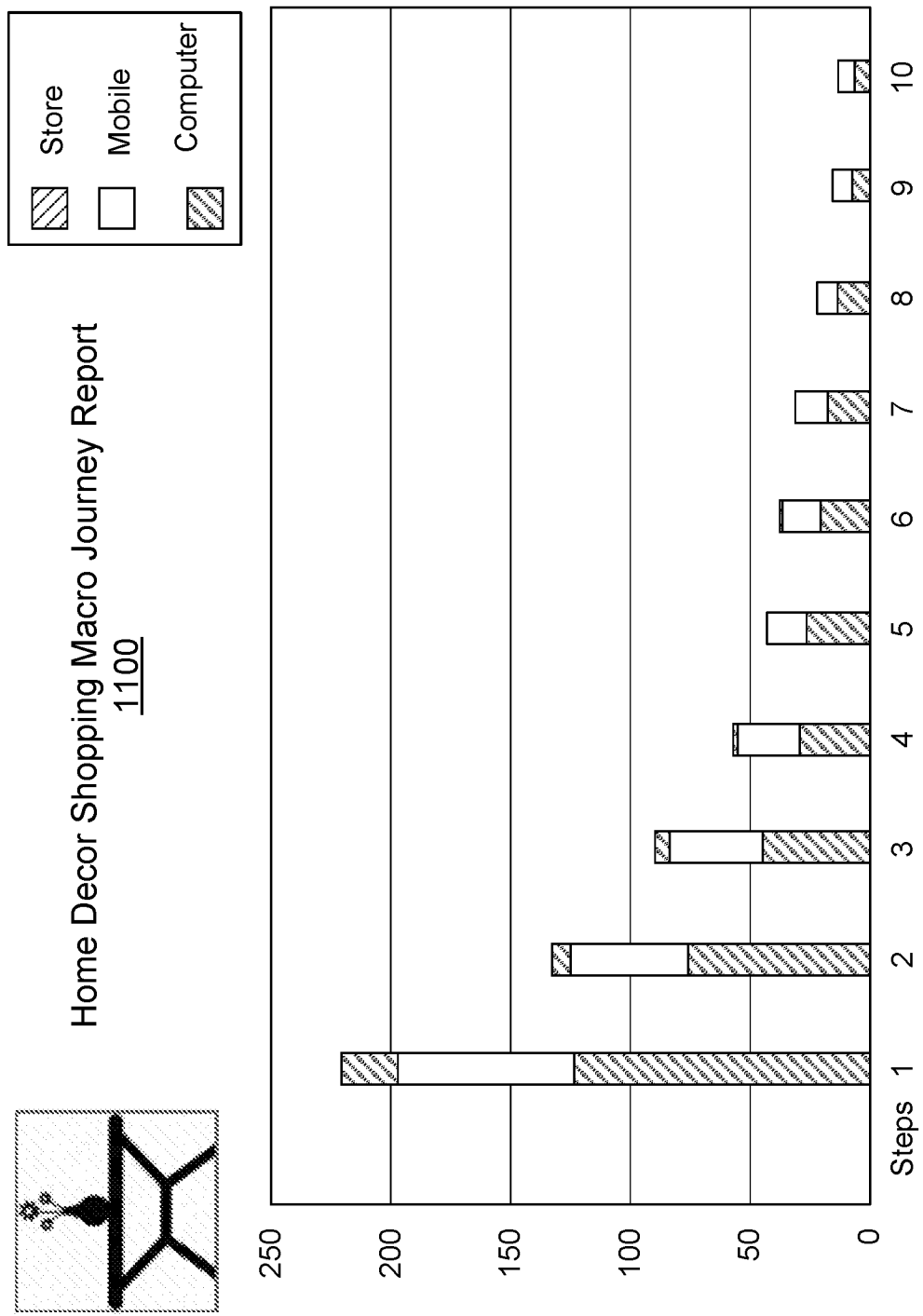
FIG. 11 illustrates an example macro journey report for home décor shopping across the same retailers according to some embodiments of the disclosed technology.

The user journey reports may include one or more macro journey reports. Each macro journey report may provide information describing a series of macro journey steps performed by a group of users in a time-stamped sequence of shopping. FIGS. 10 and 11 illustrates two macro journey reports analyzing methods of shopping for different goods according to some embodiments of the disclosed technology. FIG. 10 illustrates an example macro journey report 1000 for toy shopping across multiple retailers according to some embodiments of the disclosed technology. FIG. 11 illustrates an example macro journey report 1100 for home décor shopping across the same retailers according to some embodiments of the disclosed technology. In both FIGS. 10 and 11, the horizontal axis of the depicted charts numbers the first ten steps in the shopping process, and the vertical axis represents the number of shoppers. In each step, the volume of shoppers is divided into macro categories that indicate the number of shoppers shopping at the store, using a mobile device, and using a computer. By comparing the reports 1000 and 1100, a user can readily see that the largest category for toy shopping is in-store shopping, while the largest category for home décor shopping is by mobile device. Two takeaways are apparent from comparing these reports 1000 and 1100. For toy shopping, a retailer should optimize the in-store experience. And for home décor shopping, retailer should lead with our mobile-first strategy to best reach shoppers.

Figure 12:
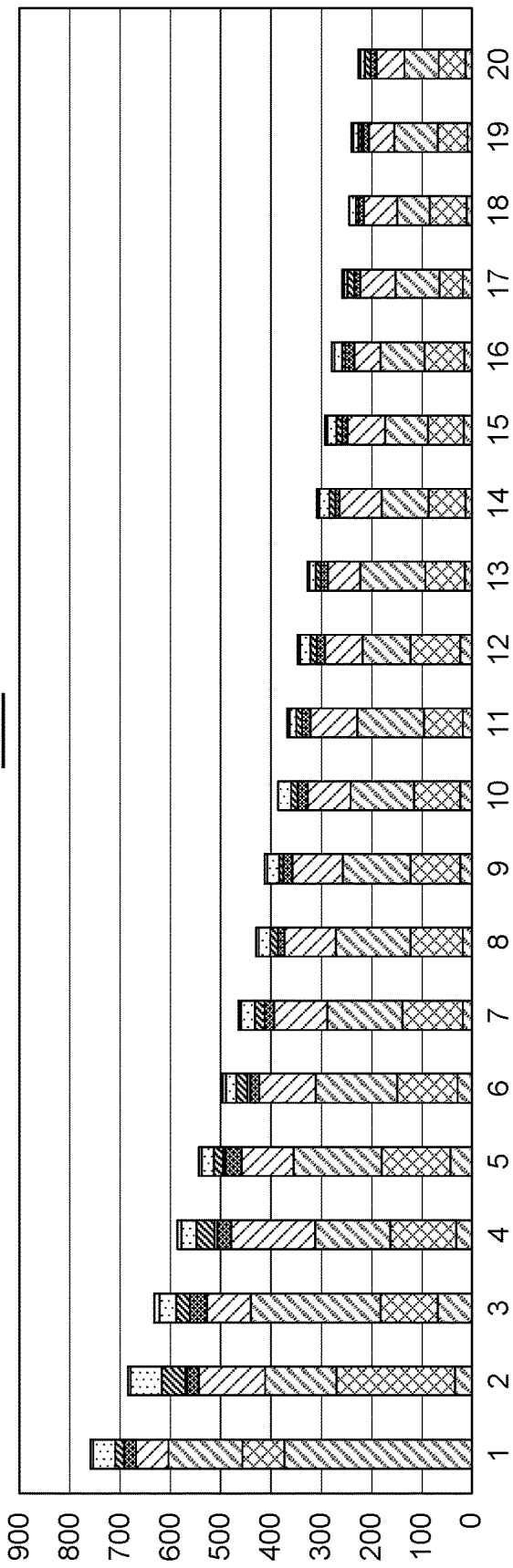
FIG. 12 illustrates an example micro journey report for non-grocery goods for a retailer according to some embodiments of the disclosed technology.
Figure 13:
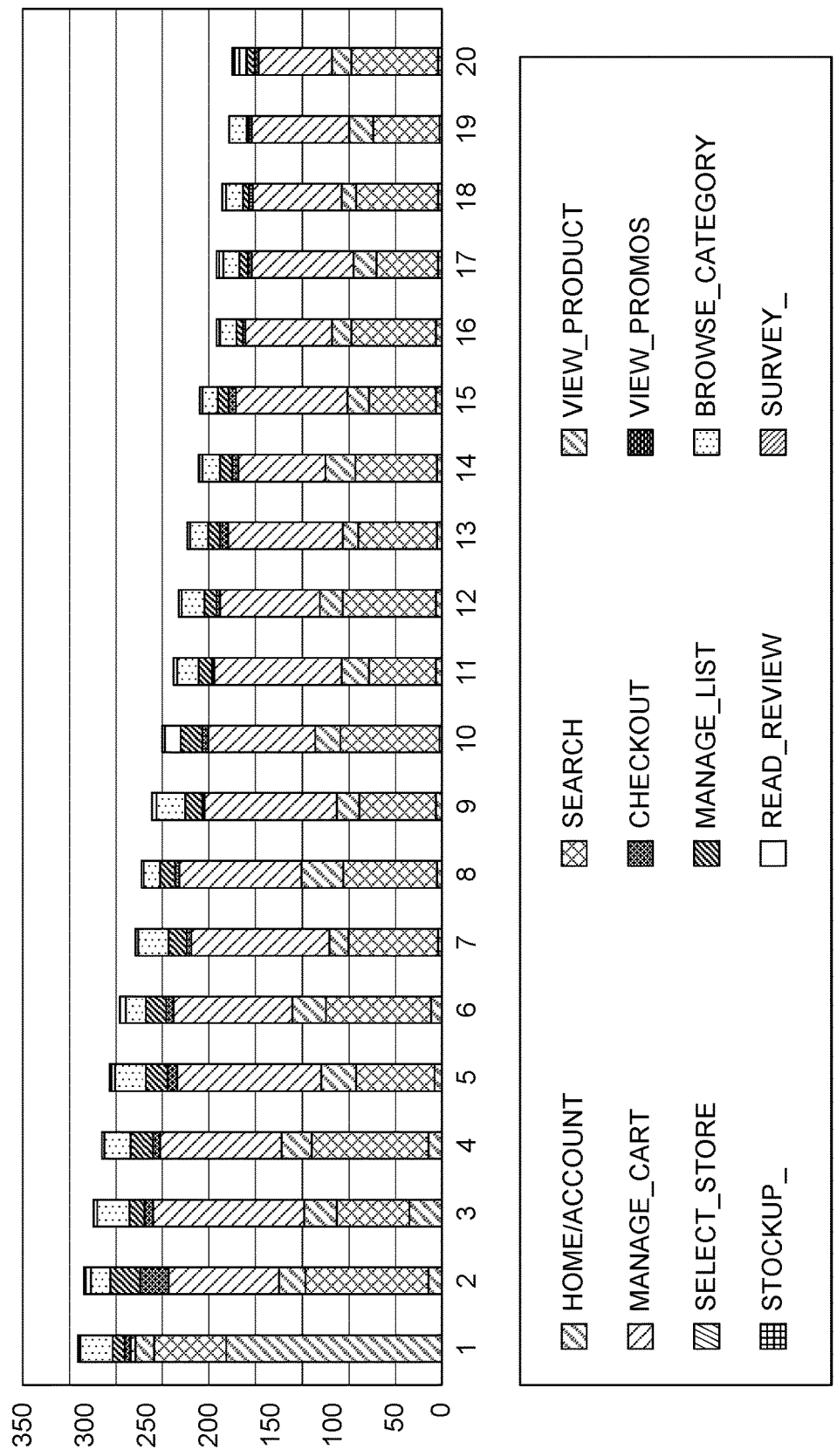
FIG. 13 illustrates an example micro journey report for non-grocery goods for the same retailer according to some embodiments of the disclosed technology.

FIGS. 12 and 13 illustrate two micro journey reports analyzing methods of shopping for different categories of goods for a particular online retailer according to some embodiments of the disclosed technology. FIG. 12 illustrates an example micro journey report 1200 for non-grocery goods for a retailer according to some embodiments of the disclosed technology. FIG. 13 illustrates an example micro journey report 1300 for non-grocery goods for the same retailer according to some embodiments of the disclosed technology.

In both FIGS. 12 and 13, the horizontal axis of the depicted charts numbers the first 20 steps in the shopping process, and the vertical axis represents the number of shoppers. In each step, the volume of shoppers is divided into specific activities. Each of these activities may correspond to one of the events described above regarding event matching. By comparing the reports 1200 and 1300, a user can readily compare the usage of different activities for grocery versus non-grocery goods. For example, a user can clearly see heavier usage of the View_Product activity for non-grocery goods than for grocery goods. Such insights allow the retailer to optimize the online shopping experiences for each category of goods.

Figure 14:
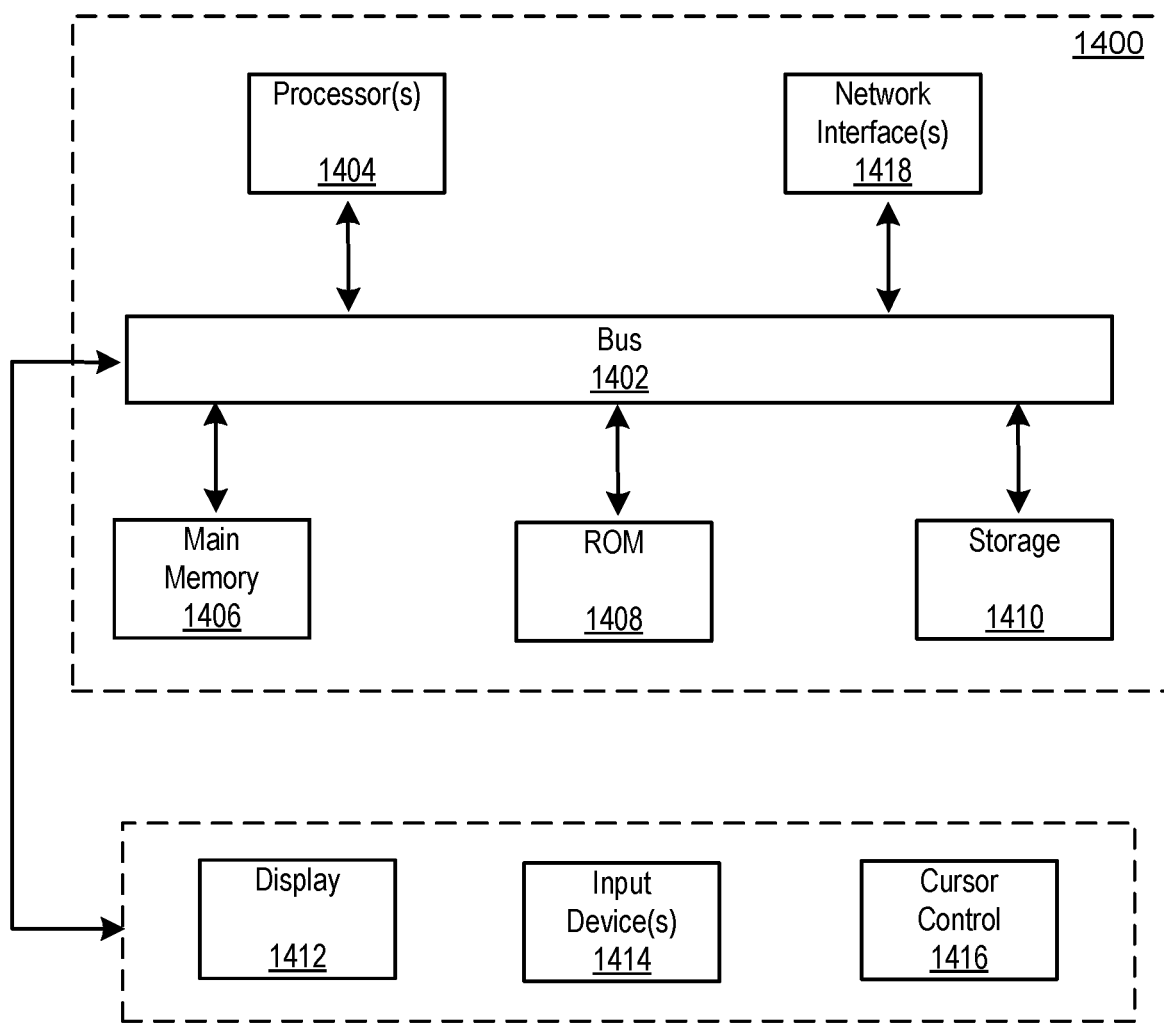
FIG. 14 is an example computing component that may be used to implement various features of embodiments described in the present disclosure.

FIG. 14 depicts a block diagram of an example computer system 1400 in which embodiments described herein may be implemented. The computer system 1400 includes a bus 1402 or other communication mechanism for communicating information, one or more hardware processors 1404 coupled with bus 1402 for processing information. Hardware processor(s) 1404 may be, for example, one or more general purpose microprocessors.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to a display 1412, such as a liquid crystal display (LCD) (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. In some embodiments, the same direction information and command selections as cursor control may be implemented via receiving touches on a touch screen without a cursor.

The computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1402. Transmission media can also take the form of acoustic or light waves, such as those generated during radio-wave and infra-red data communications.

The computer system 1400 also includes a communication interface 1418 coupled to bus 1402. Network interface 1418 provides a two-way data communication coupling to one or more network links that are connected to one or more local networks. For example, communication interface 1418 may be an integrated services digital network (ISDN) card, cable modem, satellite modem, or a modem to provide a data communication connection to a corresponding type of telephone line. As another example, network interface 1418 may be a local area network (LAN) card to provide a data communication connection to a compatible LAN (or a WAN component to communicate with a WAN). Wireless links may also be implemented. In any such implementation, network interface 1418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1418, which carry the digital data to and from computer system 1400, are example forms of transmission media.

The computer system 1400 can send messages and receive data, including program code, through the network (s), network link and communication interface 1418. In the Internet example, a server might transmit a requested code for an application program through the Internet, the ISP, the local network and the communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system XYZ00.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:
1. A system, comprising:
a hardware processor; and
a non-transitory machine-readable storage medium encoded with instructions executable by the hardware processor to perform a method comprising:

collecting data from user devices of multiple users, the data representing actions performed by the users on one or more network sites;

obtaining page views, each describing a visit to a webpage, based on the data;

providing the page views and the data from the user devices of multiple users as inputs to a trained machine learning model, wherein the trained machine learning model is trained using known training sets, wherein the trained machine learning model generates a classification of the webpages as one or more website categories, wherein the one or more website categories include a shopping category, and wherein the trained machine learning model operates independently and agnostically to other technology platforms;

receiving an event match configuration specifying one or more patterns of interest;

generating event matches based on the collected data and the event match configuration, wherein each of the event matches represents a portion of the collected data matching with one or more of the patterns of interest, and wherein each of the event matches indicates that one of the users visited a particular shopping site and added a particular item to a shopping cart of the user;

receiving a product metadata library (PML) configuration from a first user, wherein the PML configuration specifies a mechanism to collect raw data and an order in which the raw data is collected;

configuring, by the system using the PML configuration, a PML collector to collect the raw data using a series of configuration tables that specify a pattern recognition technique for the system to use when collecting the raw data and producing metadata;

when the raw data is received, adding the raw data into a real-time processing queue that is configured to parse and transform the raw data into the metadata in accordance with the PML configuration;

chaining, by the system, the metadata with the event matches, wherein chaining the metadata with the event matches is implemented in the order defined by the PML configuration;

receiving a project configuration specifying a time period of interest;

generating a user journey report comprising the metadata chained with the event matches that correspond with the one or more website categories determined by the trained machine learning model, wherein the event matches occurring during the time period of interest in the shopping category, and wherein the user journey report describing a series of steps performed by the users in the shopping category; and providing the user journey report to a client device.

2. The system of claim 1, wherein the user device executes a mobile application, the method further comprising:

classifying the mobile application into one or more application categories based on the data;

obtaining one or more mobile application sessions from the data, each mobile application session describing usage of the mobile application; and updating the user journey report based on the one or more application categories and the one or more mobile application sessions.

3. The system of claim 1, wherein the user device executes a browser application, the method further comprising:

obtaining page views, each describing a visit to a webpage, based on the data;

classifying the webpages into one or more website categories based on the page views and the data; and updating the user journey report based on the classified webpages and the page views.

4. The system of claim 1, further comprising:

receiving a product metadata library configuration specifying parameters for the collection of product metadata from network sites selling the products;

collecting raw product data from the network sites selling the products according to the product metadata library configuration;

parsing the raw product data into product metadata describing the products;

categorizing the product metadata into a plurality of event match categories; and updating the user journey report based on the categorized product metadata.

5. The system of claim 4, wherein categorizing the product metadata comprises:

applying the product metadata as inputs to a second trained machine learning model, wherein the second trained machine learning model outputs the categorized product metadata in response.

6. The system of claim 1, further comprising:

receiving a content match configuration specifying particular webpages of interest;

providing the content match configuration to the user device, wherein the user device collects product data from the particular webpages, and provides the product data as part of the data, in response.

7. The system of claim 1, wherein the hardware processor is further to perform the method comprising:

automatically tokenizing the page views, wherein the tokenized page views are provided as the inputs to the trained machine learning model.

8. The system of claim 1, wherein the hardware processor is further to perform the method comprising:

executing a script to initiate a content match producer that adds content match events to the data from the user devices of multiple users; and using the content match events, causing the user devices of multiple users to collect certain page contents of interest.

9. A non-transitory machine-readable storage medium encoded with instructions executable by a hardware processor of a computing component, the machine-readable storage medium comprising instructions to cause the hardware processor to perform a method comprising:

collecting data from a user device of a user, the data representing actions performed by the user on one or more network sites;

obtaining page views, each describing a visit to a webpage, based on the data;

providing the page views and the data from the user devices of multiple users as inputs to a trained machine learning model, wherein the trained machine learning model is trained using known training sets, wherein the trained machine learning model generates a classification of the webpages as one or more website categories, wherein the one or more website categories include a shopping category, and wherein the trained machine learning model operates independently and agnostically to other technology platforms;

receiving an event match configuration specifying one or more patterns of interest;

generating event matches based on the collected data and the event match configuration, wherein each of the event matches represents a portion of the collected data matching with one or more of the patterns of interest, and wherein each of the event matches indicates that one of the users visited a particular shopping site and added a particular item to a shopping cart of the user;

receiving a product metadata library (PML) configuration from a first user, wherein the PML configuration specifies a mechanism to collect raw data and an order in which the raw data is collected;

configuring, using the PML configuration, a PML collector to collect the raw data using a series of configuration tables that specify a pattern recognition technique to use when collecting the raw data and producing metadata;

when the raw data is received, adding the raw data into a real-time processing queue that is configured to parse and transform the raw data into the metadata in accordance with the PML configuration;

chaining the metadata with the event matches, wherein chaining the metadata with the event matches is implemented in the order defined by the PML configuration;

receiving a project configuration specifying a time period of interest;

generating a user journey report comprising the metadata chained with the event matches that correspond with the one or more website categories determined by the trained machine learning model, wherein the event matches occurring during the time period of interest in the shopping category, and wherein the user journey report describing a series of steps performed by the users in the shopping category; and providing the user journey report to a client device.

10. The non-transitory machine-readable storage medium of claim 9, wherein the user device executes a mobile application, the method further comprising:
classifying the mobile application into one or more application categories based on the data;
obtaining one or more mobile application sessions from the data, each mobile application session describing usage of the mobile application; and
updating the user journey report based on the one or more application categories and the one or more mobile application sessions.

11. The non-transitory machine-readable storage medium of claim 9, wherein the user device executes a browser application, the method further comprising:
obtaining page views, each describing a visit to a webpage, based on the data;
classifying the webpages into one or more website categories based on the page views and the data; and
updating the user journey report based on the classified webpages and the page views.

12. The non-transitory machine-readable storage medium of claim 9, further comprising:
receiving a product metadata library configuration specifying parameters for the collection of product metadata from network sites selling the products;
collecting raw product data from the network sites selling the products according to the product metadata library configuration;
parsing the raw product data into product metadata describing the products;
categorizing the product metadata into a plurality of event match categories; and
updating the user journey report based on the categorized product metadata.

13. The non-transitory machine-readable storage medium of claim 12, wherein categorizing the product metadata comprises:
applying the product metadata as inputs to a second trained machine learning model, wherein the second trained machine learning model outputs the categorized product metadata in response.

14. The non-transitory machine-readable storage medium of claim 9, further comprising:
receiving a content match configuration specifying particular webpages of interest;
providing the content match configuration to the user device, wherein the user device collects product data from the particular webpages, and provides the product data as part of the data, in response.

15. A computer-implemented method, comprising:
collecting data from a user device of a user, the data representing actions performed by the user on one or more network sites;
obtaining page views, each describing a visit to a webpage, based on the data;
providing the page views and the data from the user devices of multiple users as inputs to a trained machine learning model, wherein the trained machine learning model is trained using known training sets, wherein the trained machine learning model generates a classification of the webpages as one or more website categories, wherein the one or more website categories include a shopping category, and
wherein the trained machine learning model operates independently and agnostically to other technology platforms;
receiving an event match configuration specifying one or more patterns of interest;
generating event matches based on the collected data and the event match configuration, wherein each of the event matches represents a portion of the collected data matching with one or more of the patterns of interest, and wherein each of the event matches indicates that one of the users visited a particular shopping site and added a particular item to a shopping cart of the user;
receiving a product metadata library (PML) configuration from a first user, wherein the PML configuration specifies a mechanism to collect raw data and an order in which the raw data is collected;
configuring, using the PML configuration, a PML collector to collect the raw data using a series of configuration tables that specify a pattern recognition technique to use when collecting the raw data and producing metadata;
when the raw data is received, adding the raw data into a real-time processing queue that is configured to parse and transform the raw data into the metadata in accordance with the PML configuration;
chaining the metadata with the event matches, wherein chaining the metadata with the event matches is implemented in the order defined by the PML configuration;
receiving a project configuration specifying a time period of interest;
generating a user journey report comprising the metadata chained with the event matches that correspond with the one or more website categories determined by the trained machine learning model, wherein the event matches occurring during the time period of interest in the shopping category, and wherein the user journey report describing a series of steps performed by the users in the shopping category; and providing the user journey report to a client device.

16. The computer-implemented method of claim 15, wherein the user device executes a mobile application, the method further comprising:

classifying the mobile application into one or more application categories based on the data;

obtaining one or more mobile application sessions from the data, each mobile application session describing usage of the mobile application; and updating the user journey report based on the one or more application categories and the one or more mobile application sessions.

17. The computer-implemented method of claim 15, wherein the user device executes a browser application, the method further comprising:

obtaining page views, each describing a visit to a webpage, based on the data;

classifying the webpages into one or more website categories based on the page views and the data; and updating the user journey report based on the classified webpages and the page views.

18. The computer-implemented method of claim 15, further comprising:

receiving a product metadata library configuration specifying parameters for the collection of product metadata from network sites selling the products;

collecting raw product data from the network sites selling the products according to the product metadata library configuration;

parsing the raw product data into product metadata describing the products;

categorizing the product metadata into a plurality of event match categories; and updating the user journey report based on the categorized product metadata.

19. The computer-implemented method of claim 18, wherein categorizing the product metadata comprises:

applying the product metadata as inputs to a second trained machine learning model, wherein the second trained machine learning model outputs the categorized product metadata in response.

\* \* \* \* \*